(12) United States Patent
Frankenstein et al.

(10) Patent No.: US 9,645,574 B2
(45) Date of Patent: May 9, 2017

(54) MODEL-BASED METHOD FOR MONITORING THE CONDITION OF ROTOR BLADES

(75) Inventors: Bernd Frankenstein, Ullersdorf (DE); Frank Schubert, Dresden (DE); Lars Schubert, Schönteichen OT Petershain (DE); Eberhard Schulze, Pulsnitz (DE); Herbert Friedmann, Altertheim (DE); Fritz-Otto Henkel, Höchberg (DE); Carsten Ebert, Großpösna (DE)

(73) Assignees: Wölfel Engineering GmbH + Co. KG, Höchberg (DE); Fraunhofer-Gesellschaft zur Förderung der angewandten Forschung e.V., München (DE)

( * ) Notice: Subject to any disclaimer, the term of this patent is extended or adjusted under 35 U.S.C. 154(b) by 1247 days.

(21) Appl. No.: 13/395,024

(22) PCT Filed: Sep. 7, 2010

(86) PCT No.: PCT/DE2010/001087
§ 371 (c)(1),
(2), (4) Date: May 25, 2012

(87) PCT Pub. No.: WO2011/029439
PCT Pub. Date: Mar. 17, 2011

(65) Prior Publication Data
US 2012/0253697 A1 Oct. 4, 2012

(30) Foreign Application Priority Data
Sep. 8, 2009 (EP) .................................... 09011485

(51) Int. Cl.
*G05B 23/02* (2006.01)
*F03D 17/00* (2016.01)

(52) U.S. Cl.
CPC ......... *G05B 23/0254* (2013.01); *F03D 17/00* (2016.05); *F05B 2260/80* (2013.01); *F05B 2270/334* (2013.01); *G05B 2219/2619* (2013.01)

(58) Field of Classification Search
CPC ................................................. G05B 23/0254
(Continued)

(56) References Cited

U.S. PATENT DOCUMENTS 6,785,637 B1 * 8/2004 Wobben ................ F03D 7/0264
702/188
7,017,421 B2 * 3/2006 Kehlenbach ............ G01L 1/165
73/800

(Continued)

FOREIGN PATENT DOCUMENTS

DE 20021970 U1 4/2001
DE 10065314 A1 * 7/2002 ............. G01H 1/006

(Continued)

OTHER PUBLICATIONS

Vokmer, Machine Translation—DE 10065314 A1, 2002.*

(Continued)

*Primary Examiner* — Ricky Ngon
(74) *Attorney, Agent, or Firm* — Schwegman Lundberg & Woessner, P.A.

(57) ABSTRACT

The invention relates to a method for monitoring the condition of rotor blades for wind turbines. It is therefore the object of the invention to increase the accuracy of the monitoring of the condition of rotor blades of wind turbines and to allow a localization of faults or defects and their exact description. In the method in accordance with the invention, eigenvibrations of a rotor blade occurring globally at the rotor blade and locally guided elastic waves are permanently detected with time and spatial resolution using a sensor (Continued)

network and actuator network attached to the rotor blade or using a network arrangement of ultrasound transducers. In addition, elastic waves which are guided periodically at predefinable time intervals and which are respectively emitted by an actuator or ultrasound transducer and detected by sensors or ultrasound transducers are in so doing inspected for variations of the emitted waves.

14 Claims, 19 Drawing Sheets

(58) Field of Classification Search
USPC .......................................................... 702/39
See application file for complete search history.

(56) References Cited

U.S. PATENT DOCUMENTS

| 7,883,319 | B2* | 2/2011 | Volkmer | F03D 11/0025 |
| | | | | 416/146 R |
| 8,316,716 | B2* | 11/2012 | Kuhlmeier | G01H 1/003 |
| | | | | 73/587 |
| 8,525,831 | B2* | 9/2013 | Zhang | G01N 29/0654 |
| | | | | 345/419 |
| 2005/0228597 | A1* | 10/2005 | Giurgiutiu | G01M 5/0033 |
| | | | | 702/35 |
| 2009/0120192 | A1* | 5/2009 | Suzuki | G01N 29/07 |
| | | | | 73/623 |

FOREIGN PATENT DOCUMENTS

| DE | 10065314 A1 | 7/2002 |
| WO | WO-02053910 A1 | 7/2002 |
| WO | WO-2006012827 A1 | 2/2006 |

OTHER PUBLICATIONS

"International Application No. PCT/DE2010/001087, International Search Report and Written Opinion mailed Dec. 14, 2010", (Dec. 14, 2010), 12 pgs.

"International Application No, PCT/DE2010/001087, International Preliminary Report on Patentability mailed Mar. 13, 2012", (Mar. 13, 2012), 6 pgs.

Hameed, Z., et al., "Condition monitoring and fault detection of wind turbines and related algorithms: A review", Renewable and Sustainable Energy Reviews, 13(1), (Jan. 2009), 1-39.

"European Application Serial No. 10 770 973.5, Office Action mailed Jun. 17, 2016", w/ English Translation, (Jun. 17, 2016), 12 pgs.

Brincker, Rune, et al., "Automated Frequency Domain Decomposition for Operational Modal Analysis", Proceedings of the 25th SEM International Modal Analysis Conference, (2007), 7 pgs.

Brincker, Rune, et al., "Understanding Stochastic Subspace Identification", Proceedings of the 24th IMAC, (2006), 279-311.

Zhang, Lingmi, et al., "An Overview of Operational Modal Analysis: Major Development and Issues", 1st international operational modal analysis conference, (2005), 179-190.

"European Application Serial No. 10 770 973.5, Office Action mailed Feb. 8, 2017", (Feb. 8, 2017), 16 pgs.

Khoo, Lay Menn, et al., "Structural damage assessment using vibration modal analysis", Structural Health Monitoring 3.2, (2004), 177-194.

Larsen, Gunner Chr, et al., "Modal analysis of wind turbine blades", (Feb. 1, 2002).

Pedersen, Henrik Broen, et al., "Applied modal analysis of wind turbine blades", (2003).

* cited by examiner

MODEL-BASED METHOD FOR MONITORING THE CONDITION OF ROTOR BLADES

PRIORITY CLAIM TO RELATED APPLICATIONS

This application is a national stage application under 35 U.S.C. §371 of PCT/DE2010/001087, filed Sep. 7, 2010, and published as WO 2011/029439 A1 on Mar. 17, 2011, which claims priority to European Application No. 09 011 485.1, filed Sep. 8, 2009, which applications and publication are incorporated by reference as if reproduced herein and made a part hereof in their entirety, and the benefit of priority of each of which is claimed herein.

The invention relates to a method for monitoring the condition of rotor blades for wind turbines. The rotor blades are among the most heavily stressed parts of wind turbines. In addition to the stresses arising from their deadweight and the rotation and to the wind, they are also exposed to further external influences such as frost and high temperatures, but also lightning strikes. They are usually manufactured from composite materials and a monitoring of their condition is therefore required which frequently has to be carried out manually at periodic time intervals with a correspondingly high effort.

Other techniques for monitoring the condition are also known.

In DE 100 65 314 B4, for example, a monitoring is described in which eigenfrequency spectra are detected which are then compared with reference spectra which are representative and known for specific conditions and defects at rotor blades. The principle known from this is also described in modified form in WO 02/053910 A1 and WO 2006/012827 A1, with eigenfrequency spectra being used in each case.

However, this restricts the possibilities of monitoring the condition in that no reference spectra are available for certain conditions or defects which have occurred and thus no comparison is possible. The method is based on experience. In addition, the evaluation is very complex since the frequency spectra detected are frequently not identical to an existing reference spectrum so that it is necessary to consider whether the respective condition is to be associated with the respective reference or not.

In addition, a localization of faults or defects at a rotor blade is only possible if a reference spectrum is known for exactly this fault or defect. It is obvious in this respect that this is in particular not possible with the crack formations and delaminations which frequently occur at the most varied positions at rotor blades and which can also have very different geometrical dimensions.

It is therefore the object of the invention to increase the accuracy of the monitoring of the condition of rotor blades of wind turbines and to allow a localization of faults or defects and their exact description.

In accordance with the invention, this object is achieved by a method having the features of claim 1. Advantageous embodiments and further developments of the invention can be realized using features designated in the subordinate claims.

In the model-based method in accordance with the invention, eigenvibrations of a rotor blade occurring globally at the rotor blade and locally guided elastic waves are permanently detected with time and spatial resolution using a sensor network and actuator network attached to the rotor blade or using a network arrangement of ultrasound transducers. In addition, elastic waves which are guided periodically at predefinable time intervals and which are respectively emitted by an actuator or ultrasound transducer and detected by sensors or ultrasound transducers are in so doing inspected for changes of the emitted waves.

Elastic waves guided in a defined form can be emitted for determining the transfer function of actuators or ultrasonic transducers. In this respect an acoustic signature analysis can be carried out using one or more sensors or ultrasound transducers.

In the permanent detection for the global condition monitoring as a consequence of structural damage to a rotor blade, it is advantageous to detect the signal arrival times and/or the amplitudes for the emitted elastic waves in a predefinable frequency range. In this respect, the acoustic energy and/or the ratio of acoustic amplitude to acoustic energy can be detected.

A frequency distribution of detected acoustic events can be determined for guided elastic waves which have been detected by sensors or ultrasound transducers, with respect to the respective position of a sensor or ultrasound transducer.

The transfer behavior of the rotor blade structure can be modeled from the measured signals for the vibration speeds, vibration accelerations and/or local elongations and then structural damage can be determined by a comparison between the instantaneously identified model with a previously identified model with reference to damage-sensitive model parameters.

Figure 1:
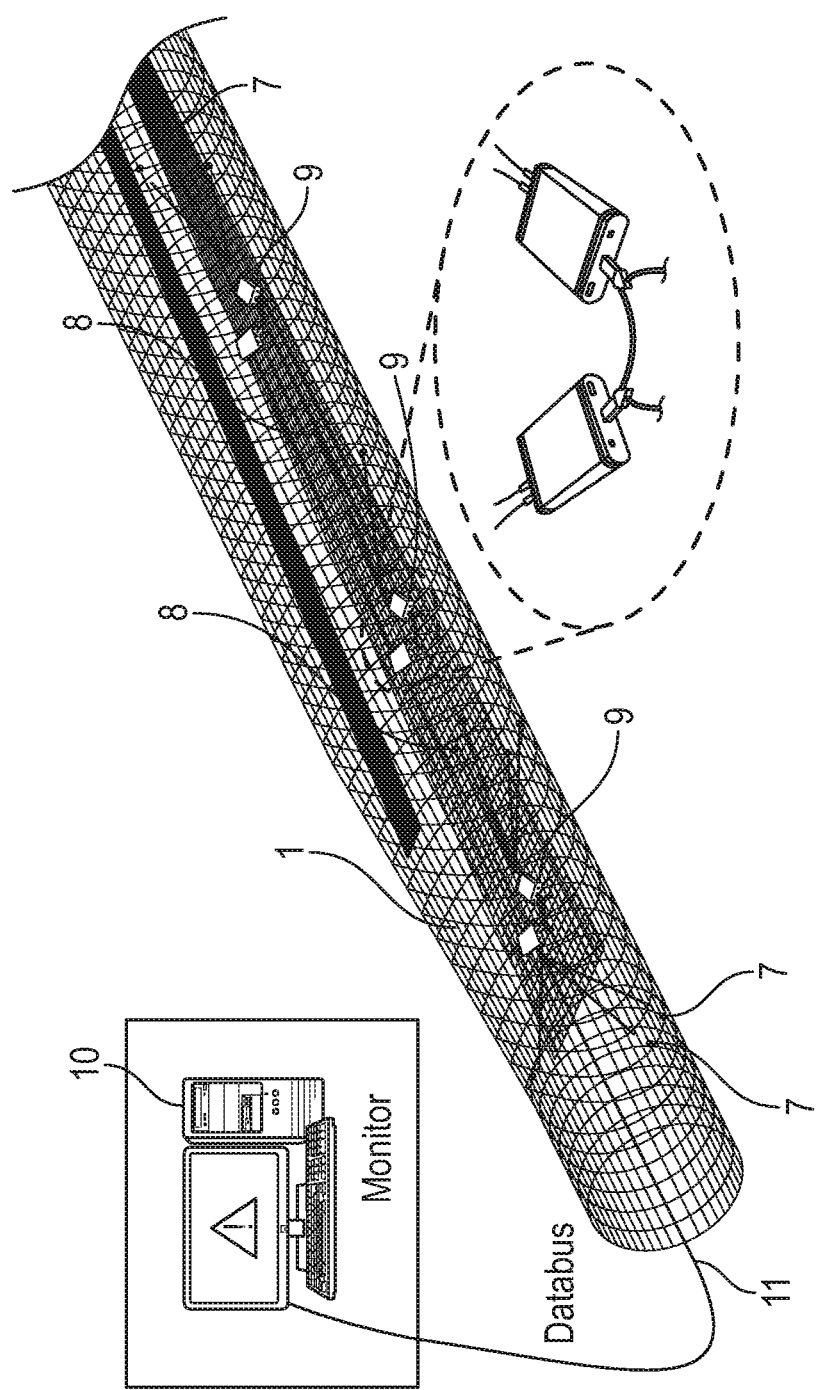
FIG. 1 is an example for the configuration of a network attached to a rotor blade.

The invention is based on a sensor network or ultrasound transducer network attached to a rotor blade in accordance with FIG. 1 and comprising sensors or ultrasound transducers and network nodes for the signal detection of guided elastic waves in the ultrasonic range and of model vibrations in the low-frequency range. Vibration speeds, vibration accelerations and local elongations can be determined and utilized to describe blade eigenvibrations and signals can be preprocessed and communicated by the network nodes.

Figure 2:
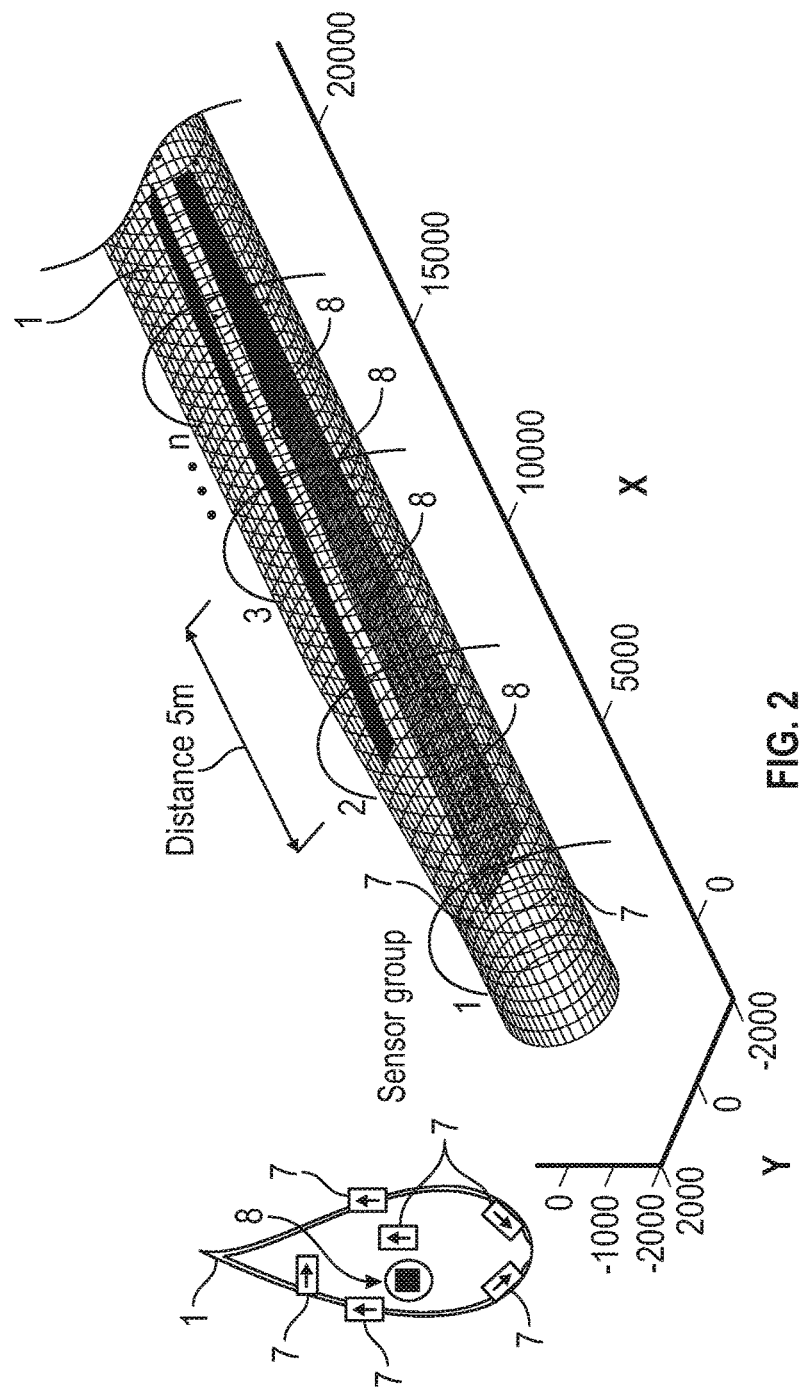
FIG. 2 shows an arrangement of sensors and actuators at a rotor blade.

A suitable arrangement of sensors or ultrasound transducers for the detection of guided elastic waves in the ultrasonic range is shown in FIG. 2. This is shown in FIG. 12 for a description of rotor blade eigenvibrations.

Figure 16:
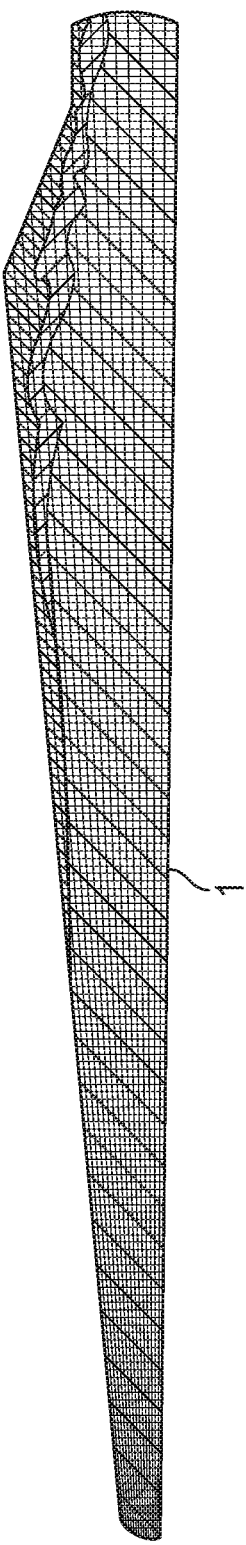
FIG. 16 shows a result of an FEM simulation.

In accordance with the invention, the rotor blade can be modeled using the finite elements method based on construction documents of the blade manufacturer (geometry, material data, boundary conditions, loads). Furthermore, static and dynamic simulations can be carried out to calculate elongations, deformations, stresses, eigenfrequencies and eigenmodes for fixing the ideal sensor and ultrasound transducer positions. (FIG. 16)

Figure 12:
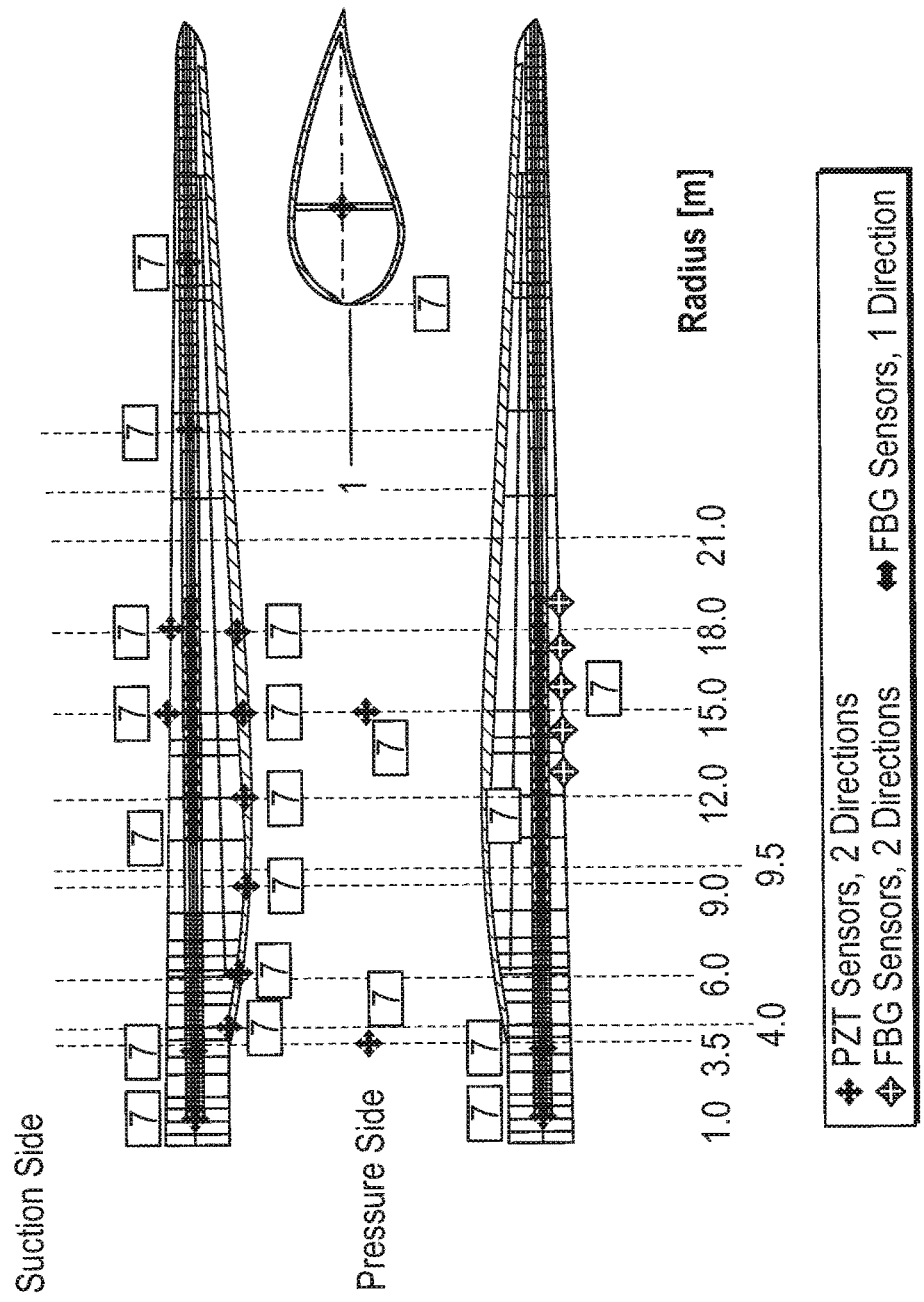
FIG. 12 shows an arrangement of sensors for the detection of eigenvibrations are shown in a plurality of views and in a sectional representation.

In accordance with the preceding simulations, the sensor arrangement can be determined distributed over the whole rotor blade, but with a concentration at the critical regions demonstrated by the FEM strength calculation and subject to the most stress in which the sensors or ultrasound transducers should be arranged at higher density and smaller intervals; in accordance with FIG. 2 for the detection of guided elastic waves in the ultrasound range and in accordance with FIG. 12 for describing rotor blade eigenfrequencies.

A procedure is followed in the invention such that a global monitoring and a local monitoring are carried out. For the global monitoring, low-frequency vibrations in the frequency range 0.1 Hz<f<500 Hz can be detected with time resolution or spatial resolution or at defined time intervals using sensors or ultrasound transducers attached to a rotor blade in the form of vibration speeds, vibration accelerations and local elongations. Based on this, a cyclic modeling of the transfer function of the rotor blade can be carried out in the form of a state space model prepared with the assistance of stochastic subspace identification (cf. in this respect R. Brincker; P. Andersen; "Understanding Stochastic Subspace Identification"; Proceedings of the 24th International Modal Analysis Conference (IMAC); St. Louis; Mo.; 2006).

The first state space model based on measured data and the FED model of the rotor blade prepared on the bass of construction data are each given the status of a reference model.

Figure 18:
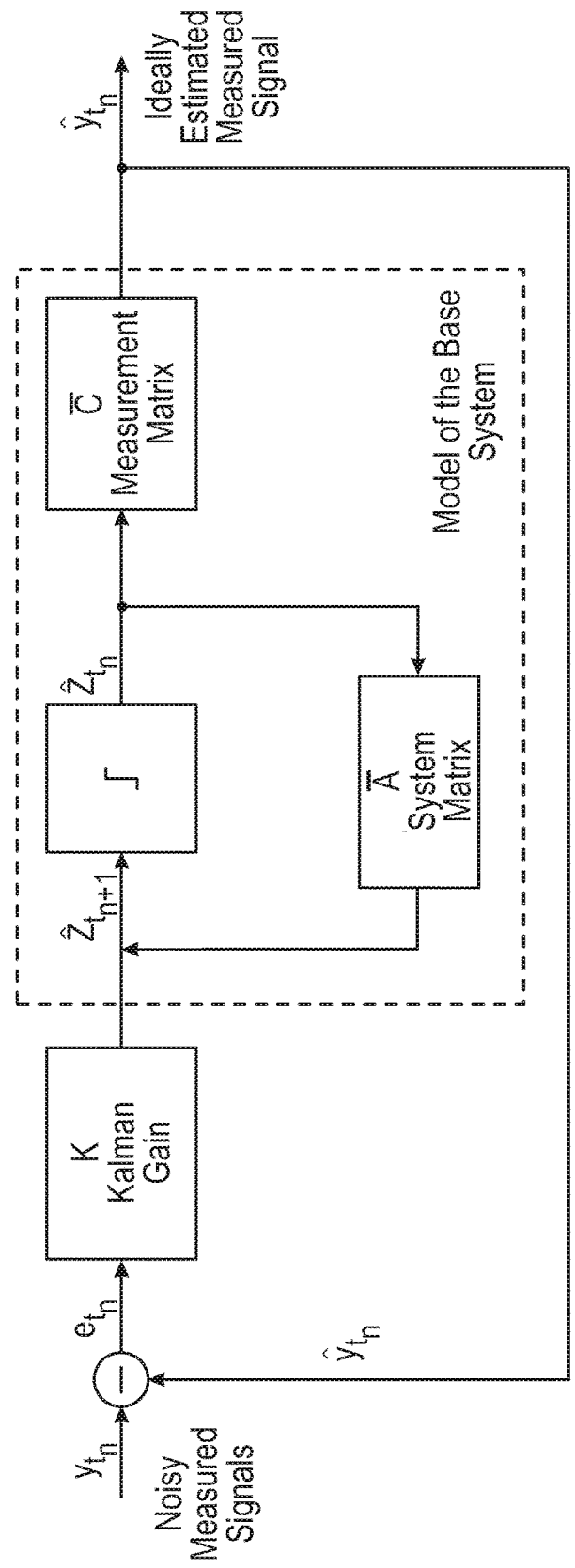
FIG. 18 shows a block diagram of a state space model, as identified with the operational modal analysis.

Using the operational modal analysis (OMA), modal parameters (eigenfrequencies, eigenmodes, see FIG. 14, modal damping, see FIG. 13) can be extracted from the identified (state space) models with spatial resolution and can be compared with the associated spatially resolved simulated parameters of the FEM model (eigenfrequencies, eigenmodes or modal damping) (see FIG. 18, operation of a state space model with output only or operational modal analysis, OMA). With respect to the measured data, in particular variations in the amplitudes which, can indicate variations in the damping and shifts of eigenfrequencies which can point to variations in the stiffness of the rotor blade or a change in the mass, e.g. due to ice formation, can be taken into account. Variations in or damage to a rotor blade can be recognized by a comparison of changed measured signals with respect to measured signals or simulation models (FEM simulation) of an undamaged rotor blade or of the starting structure of a rotor blade. In this respect, a localization of the respective damage can be achieved by guided elastic waves which are emitted on a damage event and which are detected by at least three sensors or ultrasound transducers and the position coordinates of the damage can be integrated into the simulation model and taken into account in the respect.

When making use of the FEM simulation for the positioning of sensors or ultrasound transducers, an evaluation of the elongations, deformations and mechanical stresses can be carried out for identification of the rotor blade regions prone to damage and can be supplemented by further damage-relevant parameters such as damping, eigenfrequencies and eigenmodes. Measured data of the damage-relevant parameters can be constantly compared with the reference models of the undamaged starting structure of the respective rotor blade; in order thus to be able so obtain indications of the position and type of any structural damage which may have occurred in the event of deviations in measured data from the reference model (model update). As long as the measured data and the simulation data agree, no structural damage to the rotor blade can be assumed. If, however, differences occur, the stiffness of the FEM model is varied (reduced, alleviated) for so long in the regions with high damage probability found previously be simulation until the simulated data again agree with the measured data from the network(s) modified as a consequence of any damage/defect which has occurred. One result of such a model update is a simulation model whose stiffness has been changed and whose global behavior corresponds to that of the correspondingly damaged rotor blade. The model update is supported by measured data from the acoustic emission which delivers indications on locating/localization the damage development.

Spatially resolved damage-relevant measured data from acoustic emission and acoustic signature analysis, with whose aid the changes or damage can be described by type and amount can be integrated into the finite element model (reference model) for calculating the remaining load bearing capacity. A repeat static and dynamic numerical simulation using this model of the damaged rotor blade (See FIGS. 15, 17) should deliver similar variations of eigenfrequencies and eigenmodes as the metrologically determined differences between the reference model and the current model (state space model) and can thus make a contribution to the current evaluation of the rotor blade. A decision can also be made on taking the respective wind turbine out of operation when damage/a defect has been recognized which exceeds a predefined benchmark.

After taking account of detected structural damage which has occurred at a rotor blade in the respective finite element model, the strain and/or the residual load bearing capacity present at this time can be determined.

Two methods can be used for the local monitoring:

On the one hand, there is the acoustic emission (AE) test in the frequency range from 5 kHz to 50 kHz and, on the other hand, the acoustic signature analysis (acousto-ultrasonics, AU) in the frequency range from 5 kHz to 150 kHz.

Figure 3:
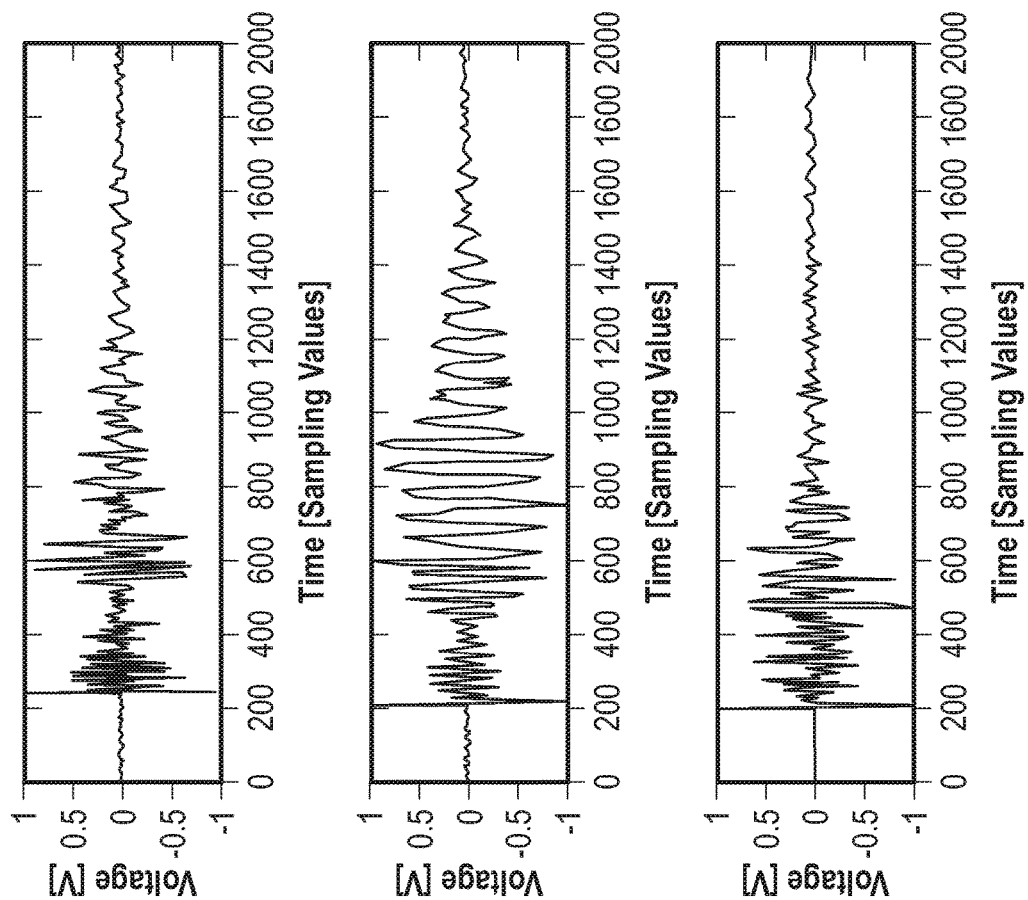
FIG. 3 illustrates the measuring principle of the acoustic emission (AE) testing at rotor blades.
Figure 3:
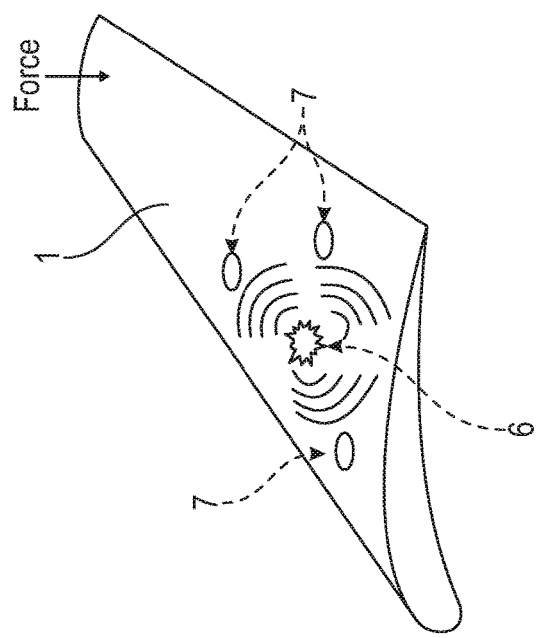

In the acoustic emission (AE) test, permanent measured signals of guided elastic waves are detected with time resolution at rotor blades and are recorded for the purpose of triangulation in groups of at least three combined sensors or ultrasound transducers (monitoring clusters) in accordance with FIG. 3. The detection takes place in a triggered manner, that is the decision for detecting a time section/time interval is made by a comparison of long-term effective value (time constant between 10 and 100 ms) and short-term effective value (time constant between 0.1 and 1 ms). The duration of this time section/time interval corresponds to the measured signal transit time between the sensors or ultrasound transducers which are combined in a monitoring cluster and which can be associated with at least one network node.

Figure 4:
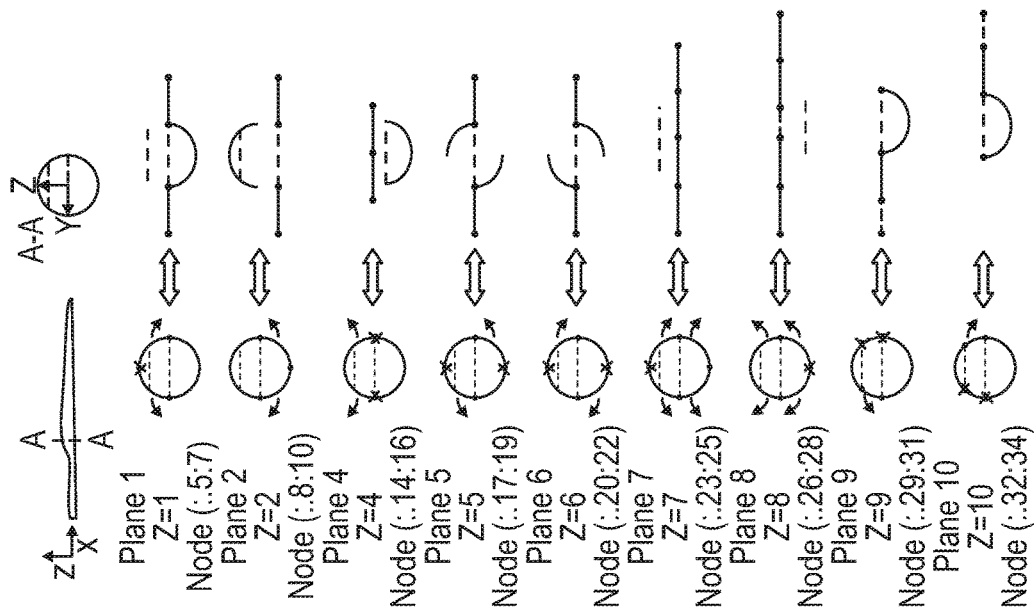
FIG. 4 illustrates how structural damage can be localized in the different structural elements of a rotor blade.
Figure 4:
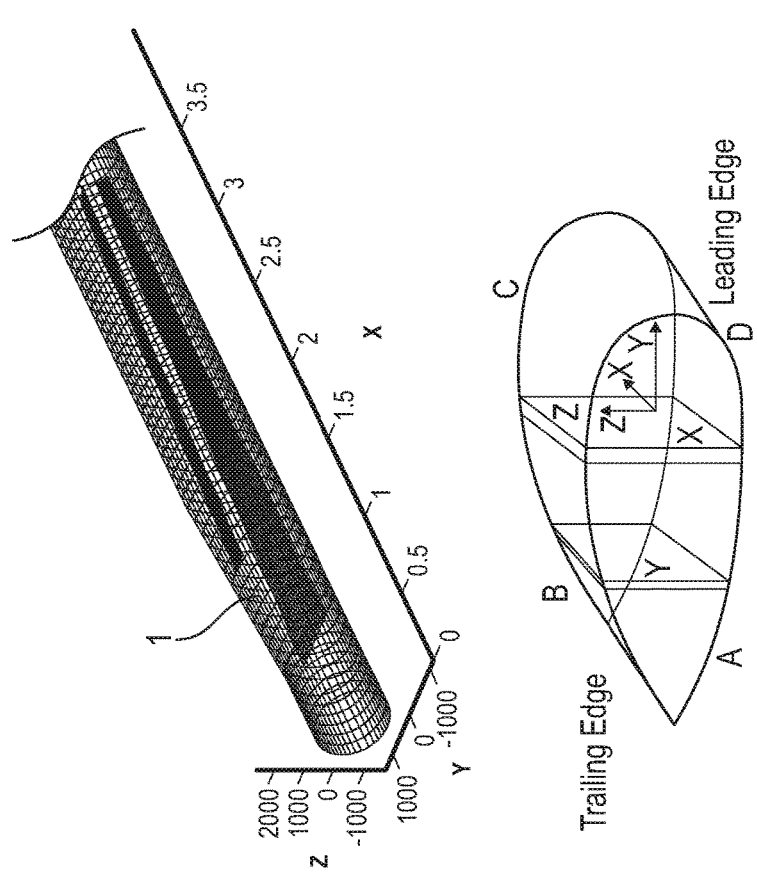
Figure 5:
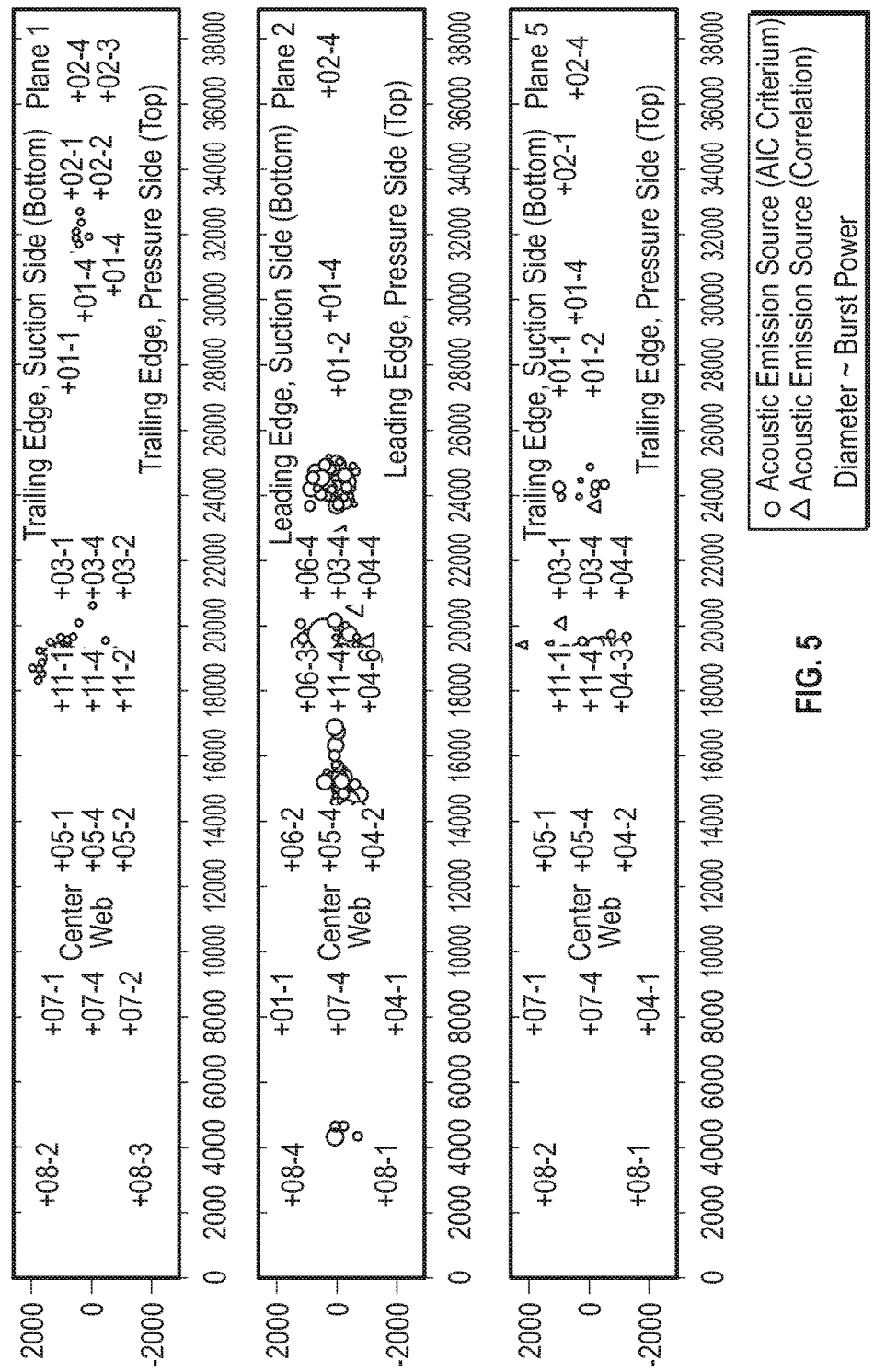
FIG. 5 illustrates signatures of the acoustic emission sources for a classification of acoustic emission events.

The transit time differences of the guided elastic waves between the sensors or ultrasound transducers and the source location (position of the emission) are calculated via a plurality of first-use determination algorithms for recognizing the measured signal start while taking account of the possible acoustic propagation planes (FIGS. 4 and 5).

The detected acoustic emission signals can be statistically evaluated in order to be able to describe the damage condition of the rotor blade from it. This is shown by way of example in FIG. 6.

Figure 7:
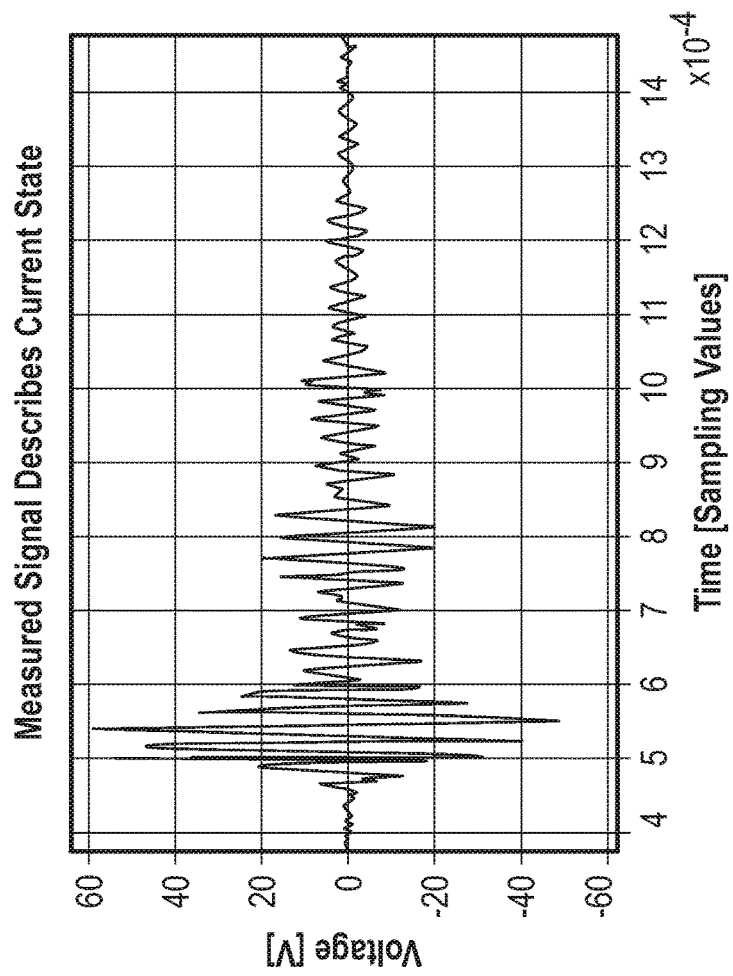
FIG. 7 shows the measurement principle of the acoustic signature analysis (acousto-ultrasonics).
Figure 7:
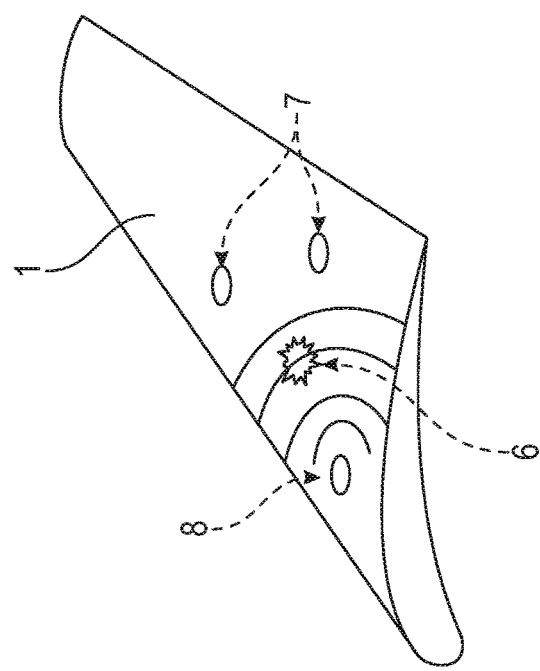

In accordance with the invention, elastic waves are introduced into the material at predefinable time intervals in the acoustic signature analysis at the respective rotor blade and are detected by the surrounding sensors or ultrasound transducers with time resolution (FIG. 7). In the event of damage, the elastic waves interact with structural damage in/at the rotor blade. This effects the signal shapes such that amplitudes and phase variations occur with time resolution. This is shown by way of example in FIG. 8.

Figure 9:
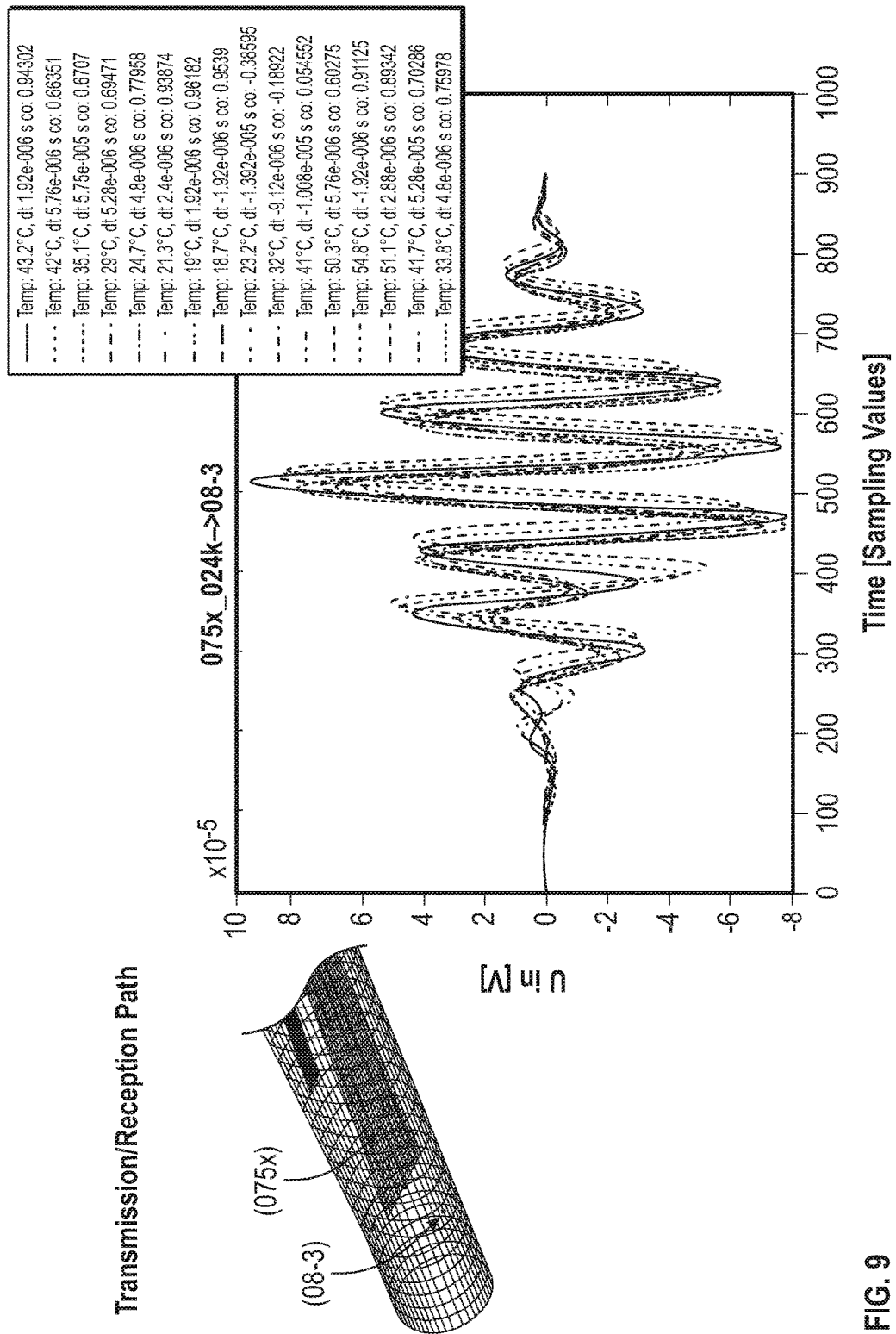
FIG. 9 shows a changing temperature influence on the transient measured signals for an emission detection path.

In this respect, the influence of changing environmental conditions should be taken into account separately from the influence of damage. In the invention, a method for compensating changing environmental conditions can be used for this purpose which utilizes correlations between environmental influences and properties of the elastic waves over longer observation periods. FIG. 9 shows the environmental influences of the measured signals by way of example. As FIG. 10 documents, variations of the damage indicator can only be associated with material defects or other structural damage after a correction of the temperature influences. A statistical evaluation of the damage indicator can furthermore be made in dependence on the environmental influences using the correction method.

Figure 11:
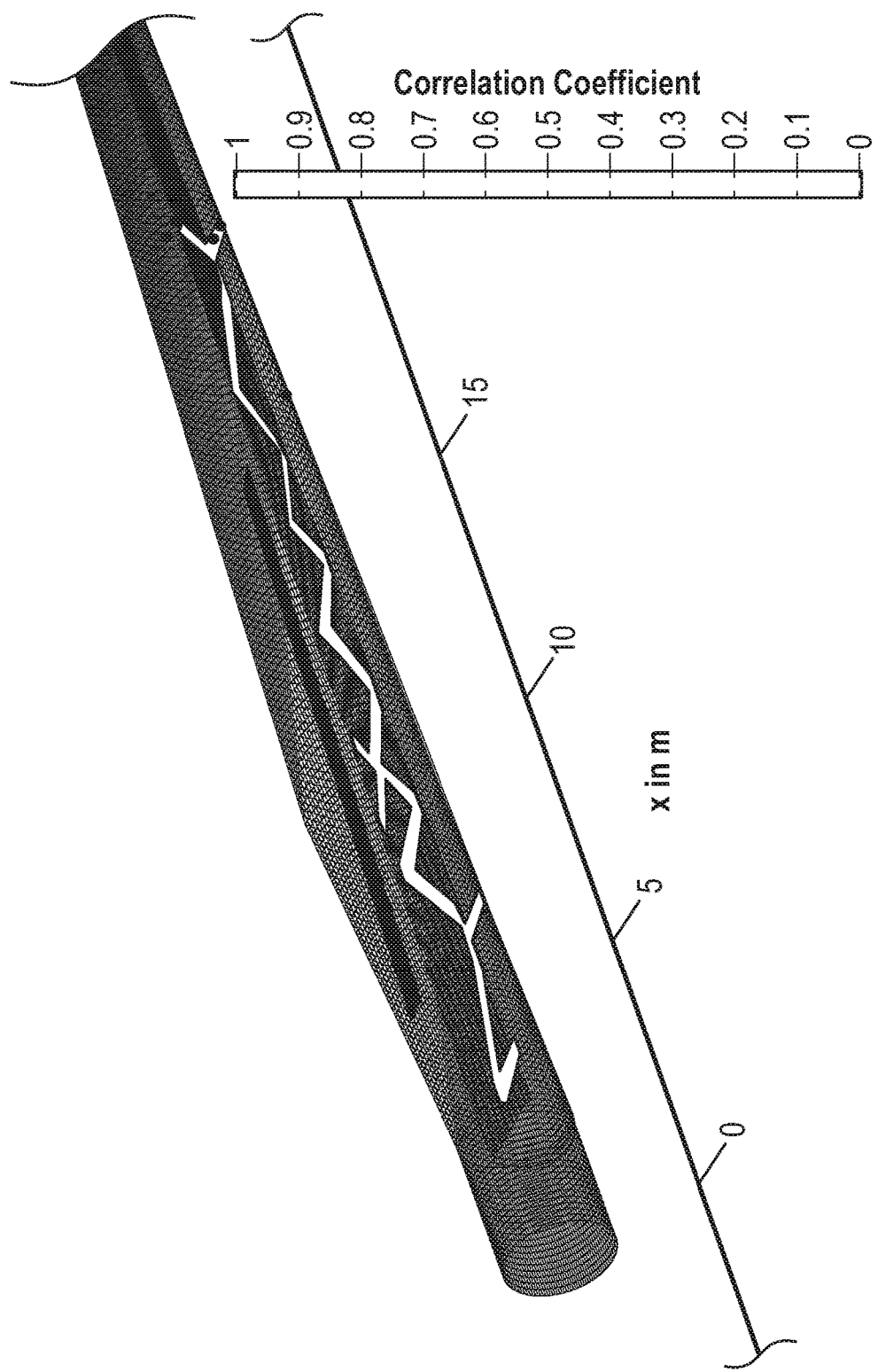
FIG. 11 shows critical regions recognized at a rotor blade.

Spatially resolved damage indicators, can be realized in the simplest case by a relation to signal paths between the position of excitation/emission and reception/detection of elastic waves. FIG. 11 shows this by way of example for the correlation coefficient as the damage indicator. The respective type of damage and the damage location (damage position) can be made more precise by iterative forward modeling processes.

The invention will be explained, in more detail by way of example in the following.

FIG. 1 shows an example for the configuration of a network attached to a rotor blade 1 having sensors 7, ultrasound transducers 2, actuators 8 and network nodes 9 for an emission, signal detection and signal transmission of guided elastic waves in the region of the ultrasound. The detected measured signals are supplied to an electronic evaluation unit 10 via a databus line 11.

An example for a suitable arrangement of actuators 8 and sensors 7 on structural elements of a rotor blade 1 for local monitoring using acoustic signature analysis (acousto-ultrasonics—AU) and acoustic emission (AB) testing. Both methods utilize guided elastic waves in the ultrasound region for detecting structural damage. In this respect, a perspective representation and a sectional representation are shown, on the one hand. In the perspective representation, the arrangement of a plurality of sensors 7 to form sensor groups can be recognized. Ultrasound waves can be emitted by the actuators 8 and can be detected by the sensors 7. It can be recognized in the sectional representation that actuators 8 can be attached to structural elements in the interior of a rotor blade for stiffening the rotor blade. Sensors 7 can likewise be attached to structural elements and to the outer wall of the rotor blade 1.

FIG. 3 illustrates the measuring principle of the acoustic emission (AE) testing at rotor blades 1. On an exceeding of local strength properties, elastically stored energy is released e.g. on a crack formation or on a crack growth. It also takes place in the event of friction and structural change. In this respect, heat can be converted into acoustic energy. Each material forwards the ultrasound waves at a speed specific to the material. The damping of these acoustic shafts is likewise specific to the material and is moreover influenced by environmental factors such as moisture or, in heterogeneous materials such as GFR laminates, also by the individual components such as epoxy resin and fiber lamella. The propagating sound waves can be detected by acoustic sensors 7. The position of the respective structural damage 6 as the source can be calculated back from the transit time differences between the detected measured signals, which emanate from individual acoustically emitting sources (active cracks, laminate problems, friction as possible structural damage 6), from a plurality of sensors 7. This is illustrated by the three diagrams which represent the measured signal curves of the three sensors 7 used in this example over time.

FIG. 4 is intended to illustrate how structural damage 6 can be localized in the different structural elements of a rotor blade 1. For this purpose, all propagation paths of sound waves over the cross-section of a rotor blade 1 can be detected and entered into a localization algorithm. There are nine propagation planes in the example shown. Plausibility observations can associate the acoustic events with the propagation planes. The problem of the spatial localization in the rotor blade 1 can thus be traced back to a two-dimensional localization in the structural elements of the rotor blade 1. As a result of this planar localization of the acoustic emission events, the positions of the acoustic emission sources determined in the propagation planes can be transformed back into a spatial coordinate system.

The result of such a planar association of acoustic emissions is shown by way of example for a time period of four hours and for three propagation planes in FIG. 5. The signatures of the acoustic emission sources differ depending on the type of algorithms used for the first use determination of the bursts. First use is understood in this respect as the point in time in a signal where the acoustic emission burst can be detected in the environmental noise signal by means of a suitable algorithm (static characteristic, Akaike's information criterion—AIC, correlation). The size of the individual signatures has been selected proportionally to the burst power.

Figure 6:
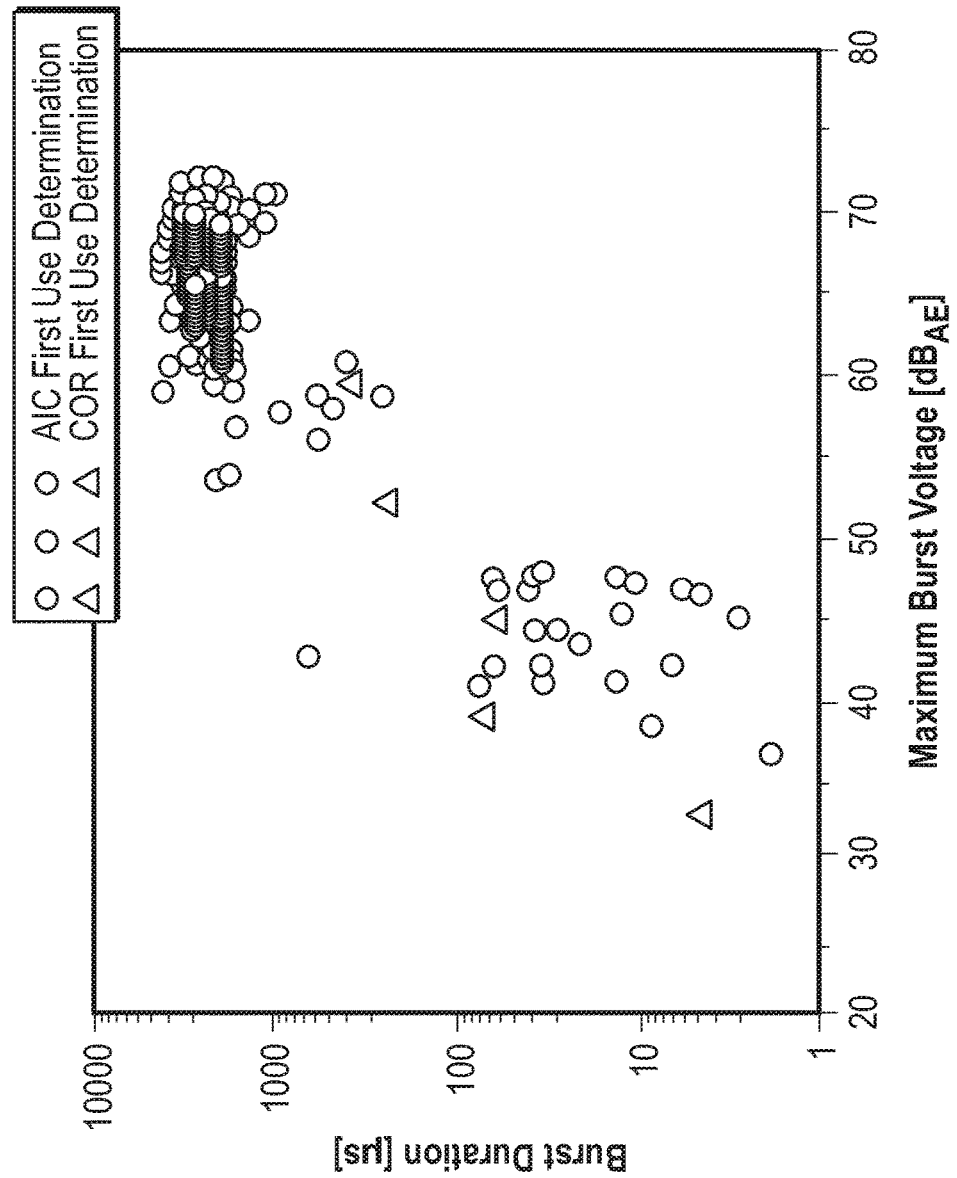
FIG. 6 shows an example for classification of acoustic emission events.

An example for a classification of acoustic emission events can be seen from FIG. 6. Acoustic emission results which occur within an hour differ considerably from one another in their amplitude (maximum burst voltage) and the length of the transit signal (burst duration). After static trial at GFR laminates, such acoustic emission parameters can be used for estimating the source mechanisms of the acoustic emissions. Analog to FIG. 5, the signatures of the acoustic emission events differ according to the type of the used first use determination of the acoustic emission events (bursts—AIC, correlation).

Figure 8:
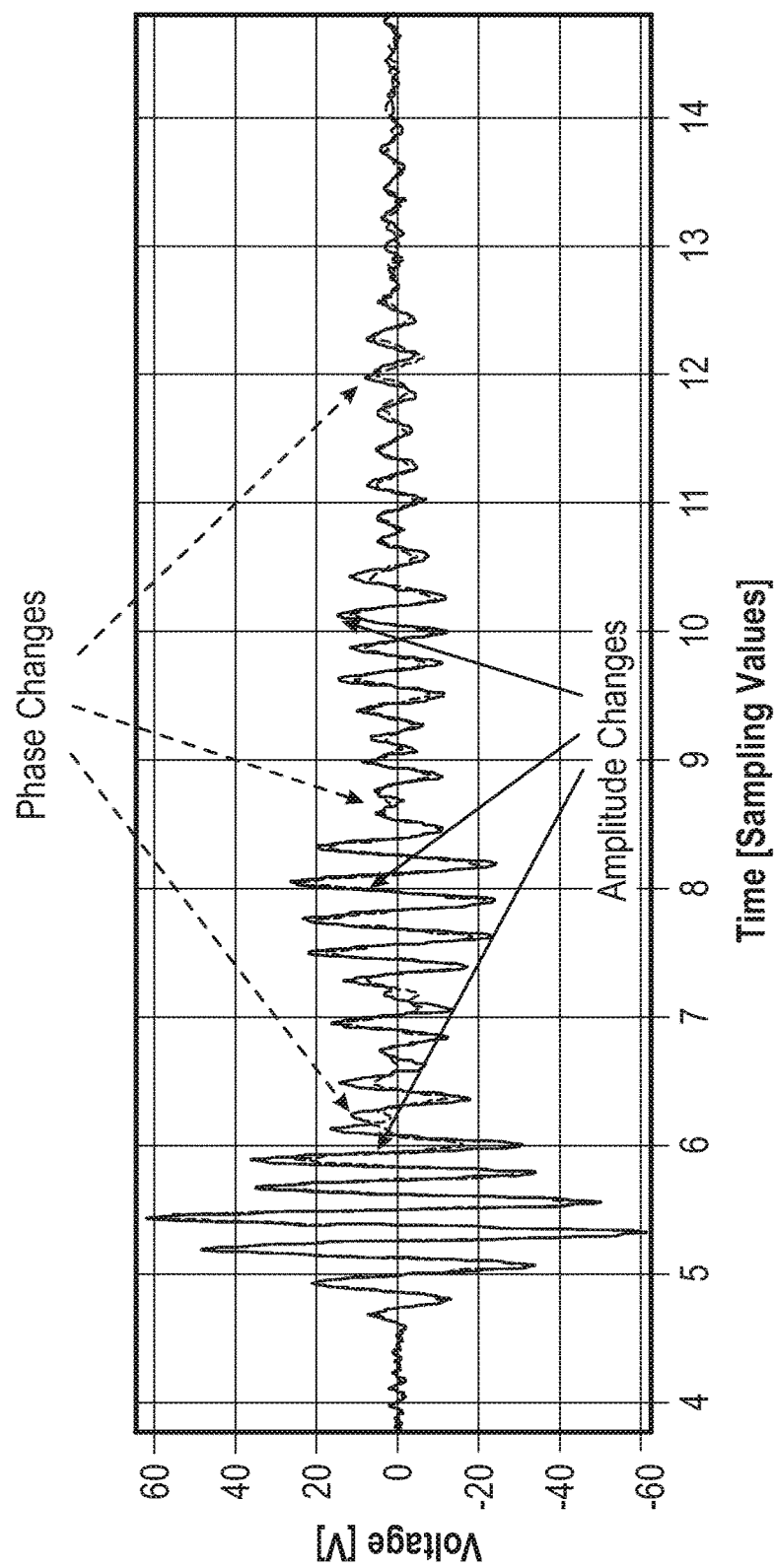
FIG. 8 shows a diagram of phase variations and amplitude variations.

The measurement principle of the acoustic signature analysis (acousto-ultrasonics) can be illustrated by FIG. 7. In this method, elastic waves are emitted into the material at the respective rotor blade 1 at predefinable time intervals and can be detected with time resolution by sensors 7 or ultrasound transducers 2 attached in the vicinity. The detected measured signals are defined in their properties by the current material properties. If the material properties change, e.g. as a consequence of crack formation or local stiffness changes, the time curves of the measured signals also change. The diagram shown in FIG. 8 shows by way of example phase variations and amplitude variations which occur as a consequence of changed material parameters in the emission detection path of the acoustic signature analysis. The amplitude-phase variations occurring in different measured signal windows can be used for damage analysis. A comparison of the measured signals recorded at different material states shows variations in the respective measured signal path which can be correlated with structural damage 6.

The diagram shown in FIG. 8 shows by way of example phase variations and amplitude variations which occur as a consequence of changed material parameters in the emission detection path of the acoustic signature analysis. The amplitude and phase variations occurring in different measured signal windows can be used for damage analysis.

A changing temperature influence on the transient measured signals for an emission detection path is illustrated, for example, by the measurement curves which are shown in FIG. 9 and which have been detected at different temperatures. In the legend, the transient time differences dt and the correlation coefficient co calculated for each measured signal are shown related to the measured signal characterizing the starting state at a temperature of 20° C. Such different environmental influences can be taken into account and eliminated in the measured signal processing of the acoustic signature analysis.

Figure 10:
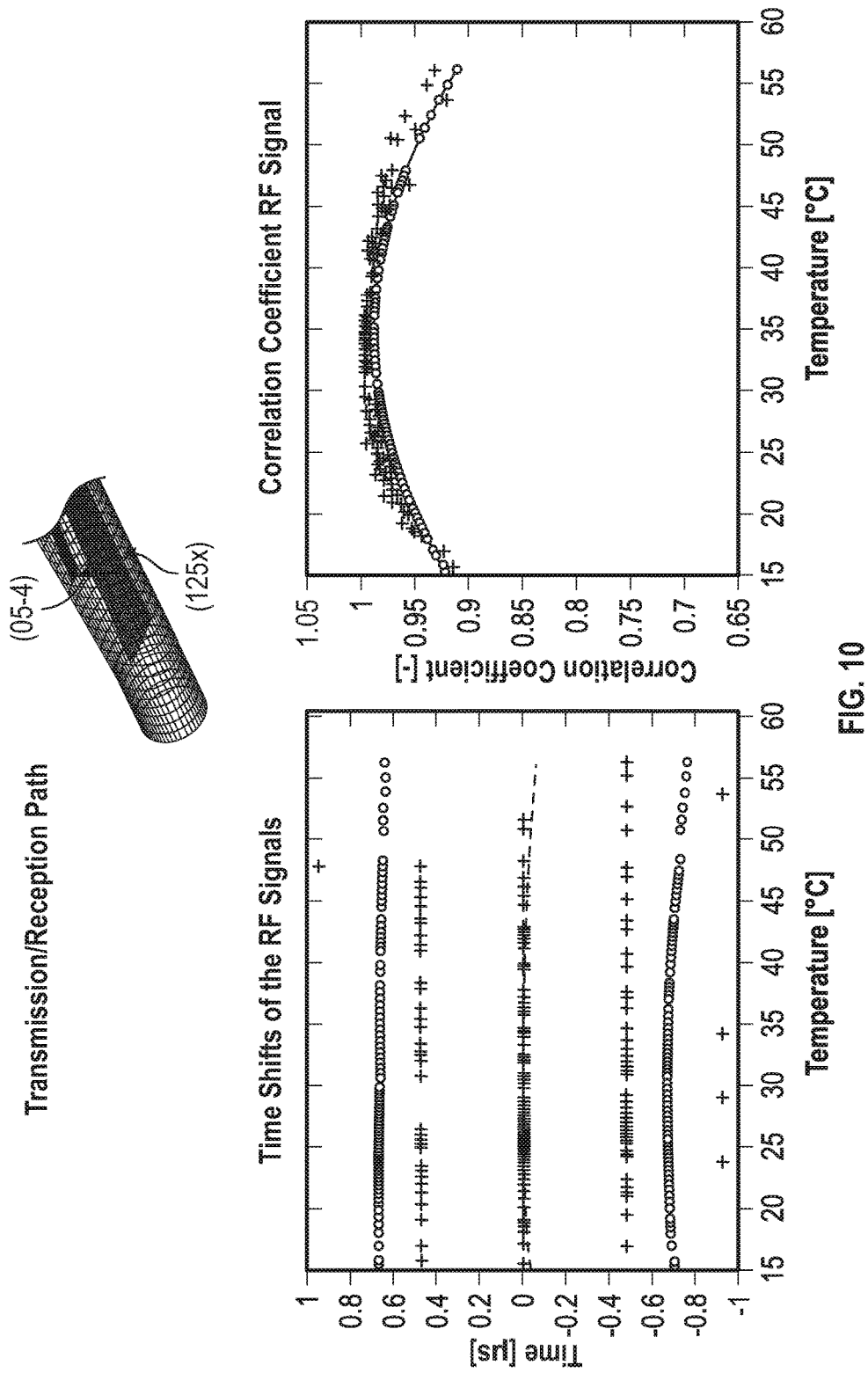
FIG. 10 shows a measured signal shifts remaining after a transient time correction and the corresponding damage indicator.

In the part of FIG. 10 arranged at the left, the measured signal shifts remaining after a transient time correction are shown which were able to be limited to ±1 sampling value and at the right the corresponding damage indicator is shown as crossed lines and the associated 95% confidence interval as a circle.

FIG. 11 is intended so show by way of example critical regions recognized at a rotor blade which are shown darker and in particular arranged at the leading edge. They were detected by defined introduction of guided waves into the rotor blade material and signature analysis. Selected emission detection paths are shown with different gray scales in the representation which corresponds to the value of the respective determined damage indicator (correlation coefficient of the starting measurement). A smaller correlation coefficient (darker) indicates damaged regions at the rotor blade 1.

In FIG. 12, the arrangement of sensors 7 for the detection of eigenvibrations are shown in a plurality of views an in a sectional representation for an example of a rotor blade 1 to be monitored. The arrangement of the sensors 7 depends on the construction of the rotor blade 1 and therefore differs depending on the type of the respective rotor blade 1. In this respect, a sensor network should be used in which sensors 7 are arranged distributed where possible over the total region or at least large regions. Elongations, also elongations as a consequence of guided elastic wave, accelerations, frequencies, amplitudes and the damping of vibrations can be detected using the sensors 7 of this sensor network.

This monitoring should be carried out at the suction side and at the pressure side as well as for bearing structures arranged inwardly. Changes at the bearing structure of rotor blades (belts, webs) and at the aerodynamic external envelope can be recognized using such a sensor network. In a sensor network, different sensors 7 can be attached so that they are particularly sensitive in specific axial directions.

Figure 13:
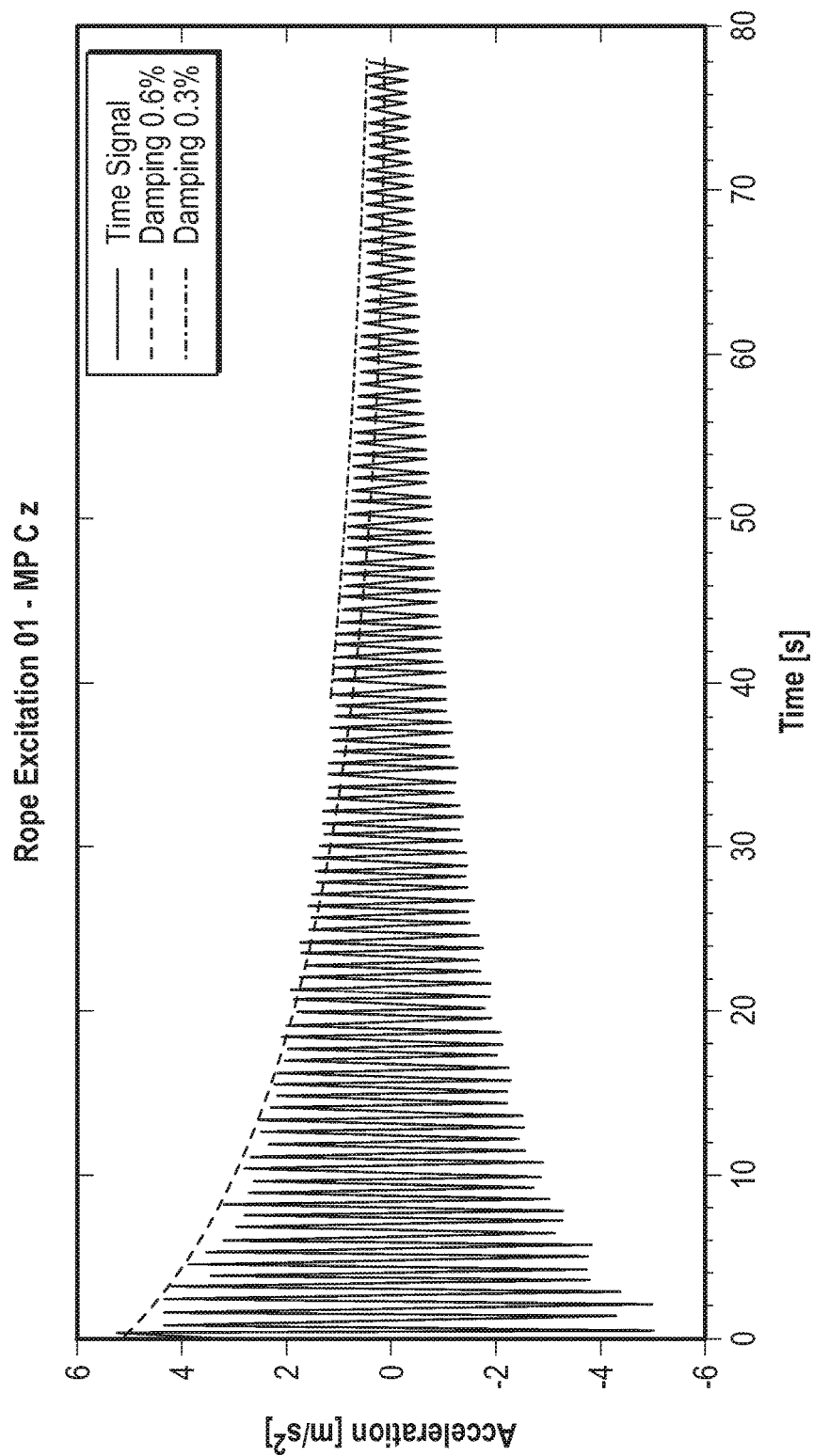
FIG. 13 shows the structural damping of the rotor blade.

FIG. 13 illustrates the structural damping of the rotor blade 1. The structural damping includes both the damping caused by the environmental air and the damping caused by material, damping or by friction. The vibration energy is in this respect always converted into a different energy form and if no new energy is supplied, the vibration decays, as can be recognized in the decay curve shown in FIG. 13. The structural damping as the sum of all different shapes of damping is determined using the operational modal analysis at a wind turbine rotating in operation.

Figure 14:
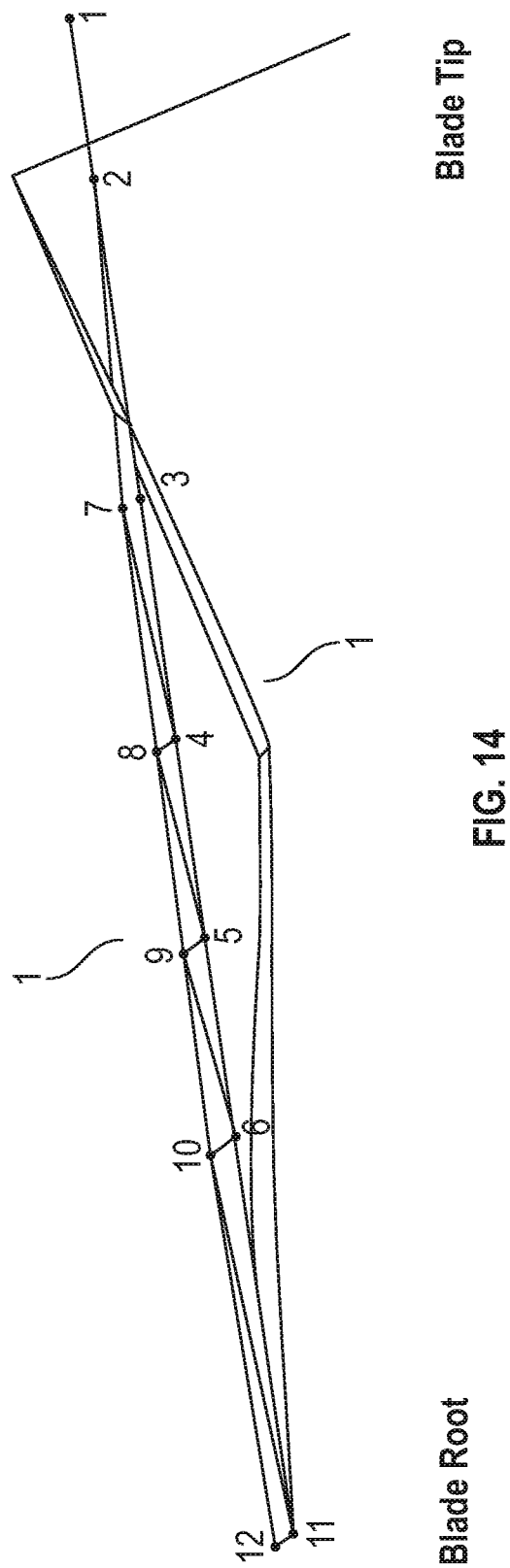
FIG. 14 shows a measured eigenmode of a rotor blade at a frequency of 5.12 Hz.

Eigenmodes of a rotor blade 1 determined using operational modal analysis are shown in FIG. 14. The global low frequency component of the monitoring system is based on the metrological detection of the modal parameters: eigenfrequencies, associated eigenmode and damping. Damage to the rotor blade 1 which reduces its strength and/or changes the damping, e.g. by friction, has an effect on the structural response, that is on the manner of reaction of a structure no a stimulation. In experiments in the lab, the structural response is determined by experimental modal analysis (EMA). In this respect, the rotor blade 1 is excited in a defined manner to make vibrations. The force which varies over time and acts thereon and the structural response resulting therefrom are measured and the associated transfer function is determined therefrom.

Since the excitation forces cannot be directly measured with a wind turbine, the experimental modal analysis cannot be used for determining the modal parameters. It can, however, be replaced by the operational modal analysis (OMA) in which the excitation function does not have to be known. The vibration excitation of the rotor blade 1 can be achieved by environmental noise, i.e. substantially by wind and by any other desired vibrations such as the impulses on the tower passage. The stochastic subspace identification in the time range or the enhanced frequency domain decomposition in the frequency range are available for the determination of the modal parameters—eigenfrequency and damping.

Each eigenfrequency of the rotor blade 1 can be associated with a very specific vibration shape, the associated eigenmode. If the stiffness of a rotor blade changes, e.g. due to damage to bearing webs, the eigenmode also changes (cf. also FIG. 1. These eigenmodes can be simulated or can be determined using a sensor network. FIG. 14 shows a measured eigenmode of a rotor blade 1 at a frequency of 5.12 Hz. In this respect, the measured signals of the individual sensors distributed over the respective rotor blade 1 are linked to one another by special software so that they reproduce the vibrations of the rotor blade in the characteristic eigenmode. Since only very few measured points are present, the vibration shape can only be shown in approximation in contrast to a simulated eigenmode. This is, however, sufficient to draw conclusions on the change of the stiffness of the rotor blade (cf. with respect to OMA: L. Zhang, R. Brincker; P. Andersen, "An Overview of Operational. Modal Analysis"; Major Development and Issues; Proceedings of the 1st International Operational Modal Analysis Conference (IOMAC); Copenhagen; Denmark 2005;

with respect to substance iteration: R. Brincker, P. Andersen; "Understanding Stochastic Subspace Identification"; Proceedings of the 24th International Modal Analysis Conference (IMAC); St. Louis; Mo.; 2006;

with respect to frequency domain decomposition: R. Brincker; P. Andersen; N. J. Jacobson; "Automated Frequency Domain Decomposition for Operational Modal Analysis"; Proceedings of the 25$^{th}$ International Modal Analysis Conference (IMAC); Orlando; Fla.; 2007).

Figure 15:
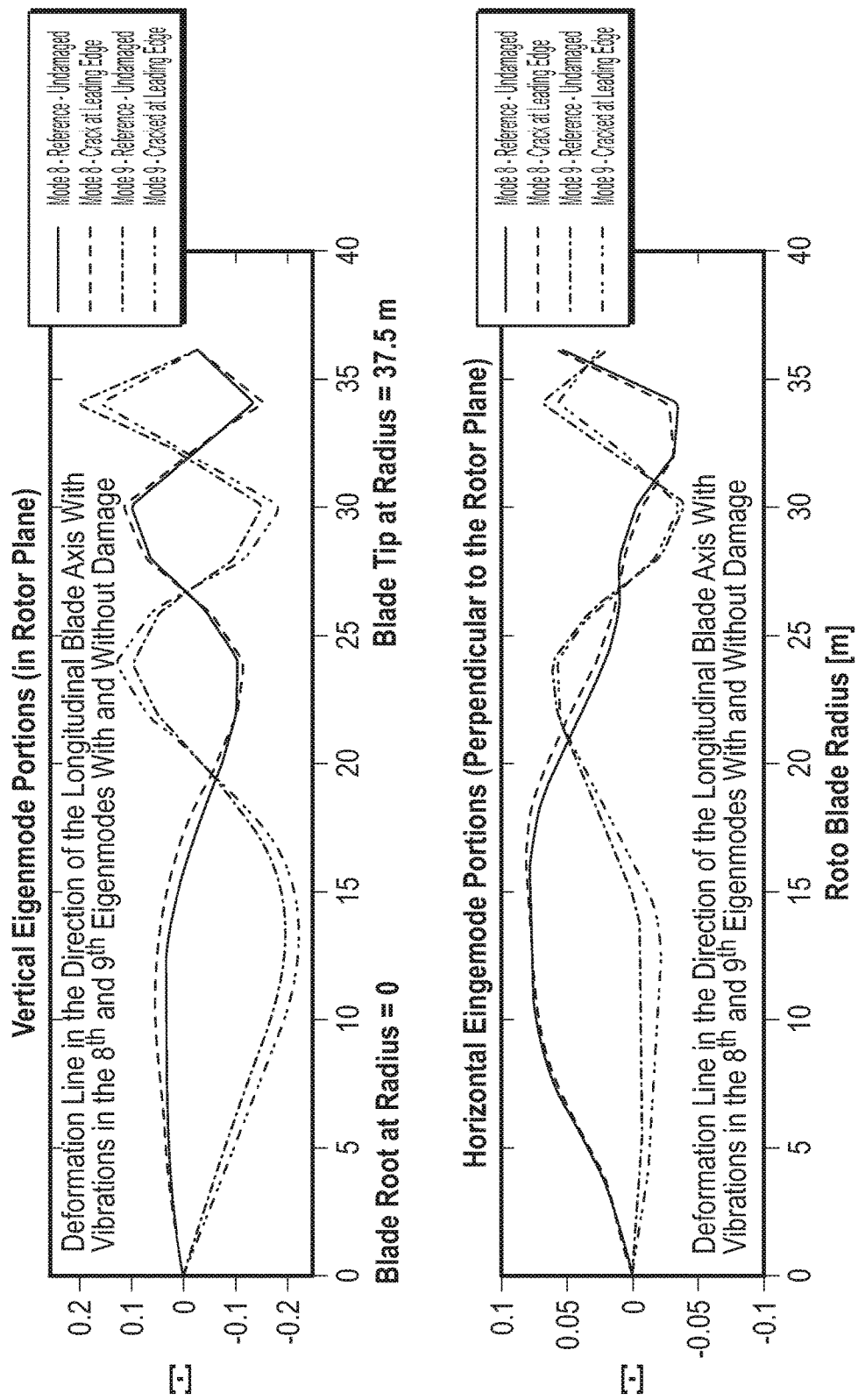
FIG. 15 shows two eigenmodes (modes 8 and 9) measured in two planes on excitation of the rotor blade in the bending direction or lay.

In FIG. 15, there are a respective two eigenmodes (modes 8 and 9) measured in two planes on excitation of the rotor blade in the bending direction or lay direction (flapwise or edgewise) before and after the occurrence of a crack at the front edge (leading edge) of the rotor blade 1. Only measured signals of sensors 7 which were arranged along the web of a rotor blade 1 were evaluated with the aid of the process of operational modal analysis. A 2D representation is thereby created. The eigenmode of the undamaged rotor blade 1 is shown by means of a respective solid line and that of the damaged rotor blade 1 by a dashed line. These lines represent the vibration shape of the rotor blade in the direction of its longitudinal axis.

FIG. 16 represents a result of an FEM simulation. Deformations, elongations, mechanical stresses, eigenfrequencies and eigenmodes can be calculated using such simulations. The mechanical stresses are shown in the shown example. The color gradation or grey value gradation can be utilized like the vertical scale of a geographic map. Here, dark colors or gray values e.g. mean regions, with greater mechanical stresses. A spatially resolved determination of the mechanical stresses can take place by the use of the respective gray scale.

Figure 17:
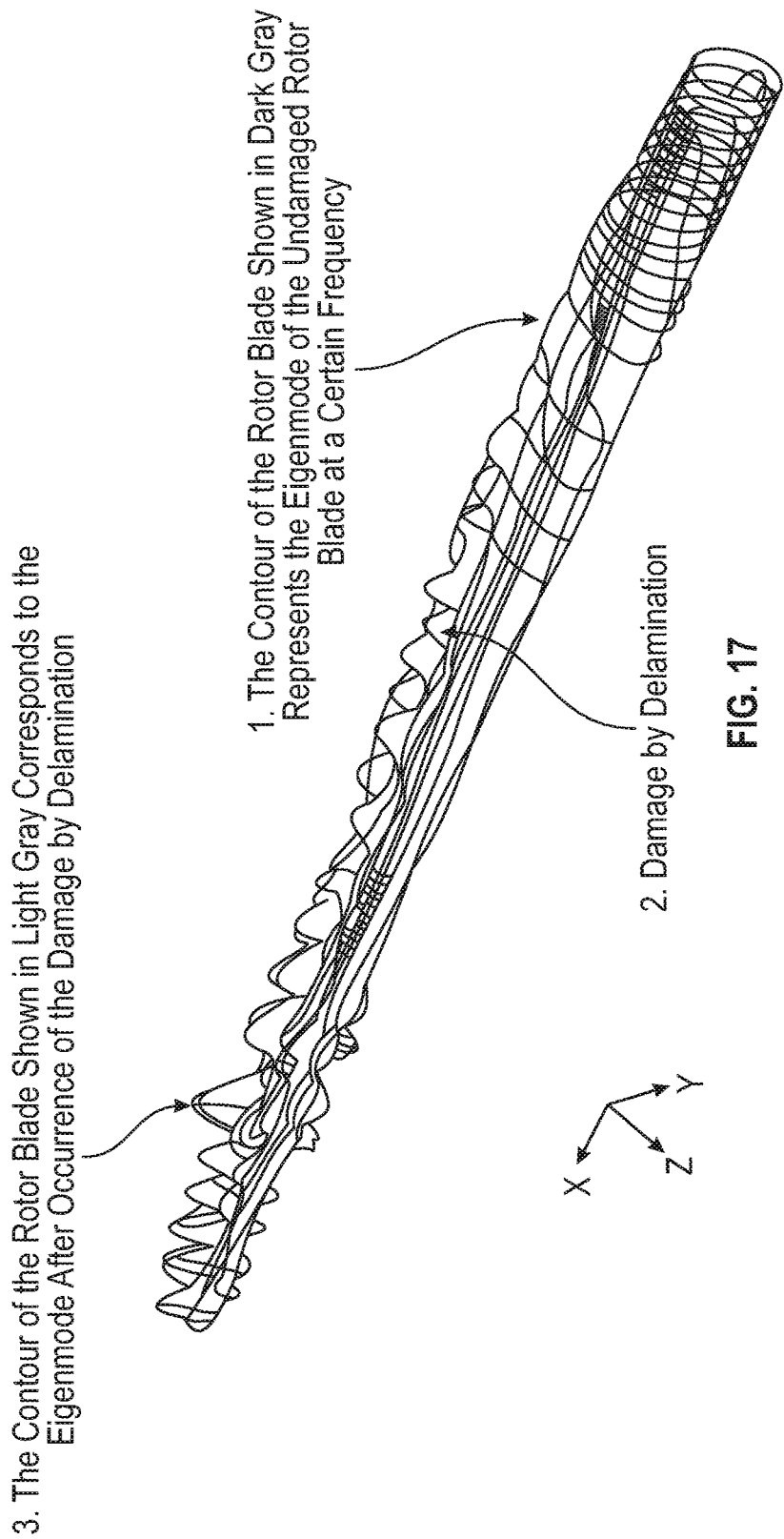
FIG. 17 shows simulation results of an undamaged rotor blade.

Simulation results of an undamaged rotor blade 1 in lighter gray and of a damaged state in dark gray are shown laid over one another in FIG. 17. A change in the stiffness of the structure and thus changes in the eigenfrequencies and eigenmodes result due to damage to the rotor blade 1—delamination or cover layer peeling at radius 20 m, the damage is marked by an arrow. This change in shape is a clear indication of damage.

A block diagram of a state space model, as identified with the operational modal analysis, is shown in FIG. 18. The dynamics of the system (of the rotor blade structure) are modeled in the stat space matrices A and C. The modal parameters of eigenfrequency, modal damping and eigenmode can be determined from these matrices by an eigenvalue decomposition. The matrix K (Kalman gain) is numerically determined so obtain a complete model of the structure in which the amplitudes and the phasing are also modeled. A so-called innovation state space model results in which the innovation—as she ideal white noise process—is applied at the system input which is formed from the difference of the measured structural responses and the structural responses estimated by the model. The damage recognition and damage localization can then take place by the continuous comparison of the numerical state space models between the reference state and the current state.

Figure 19:
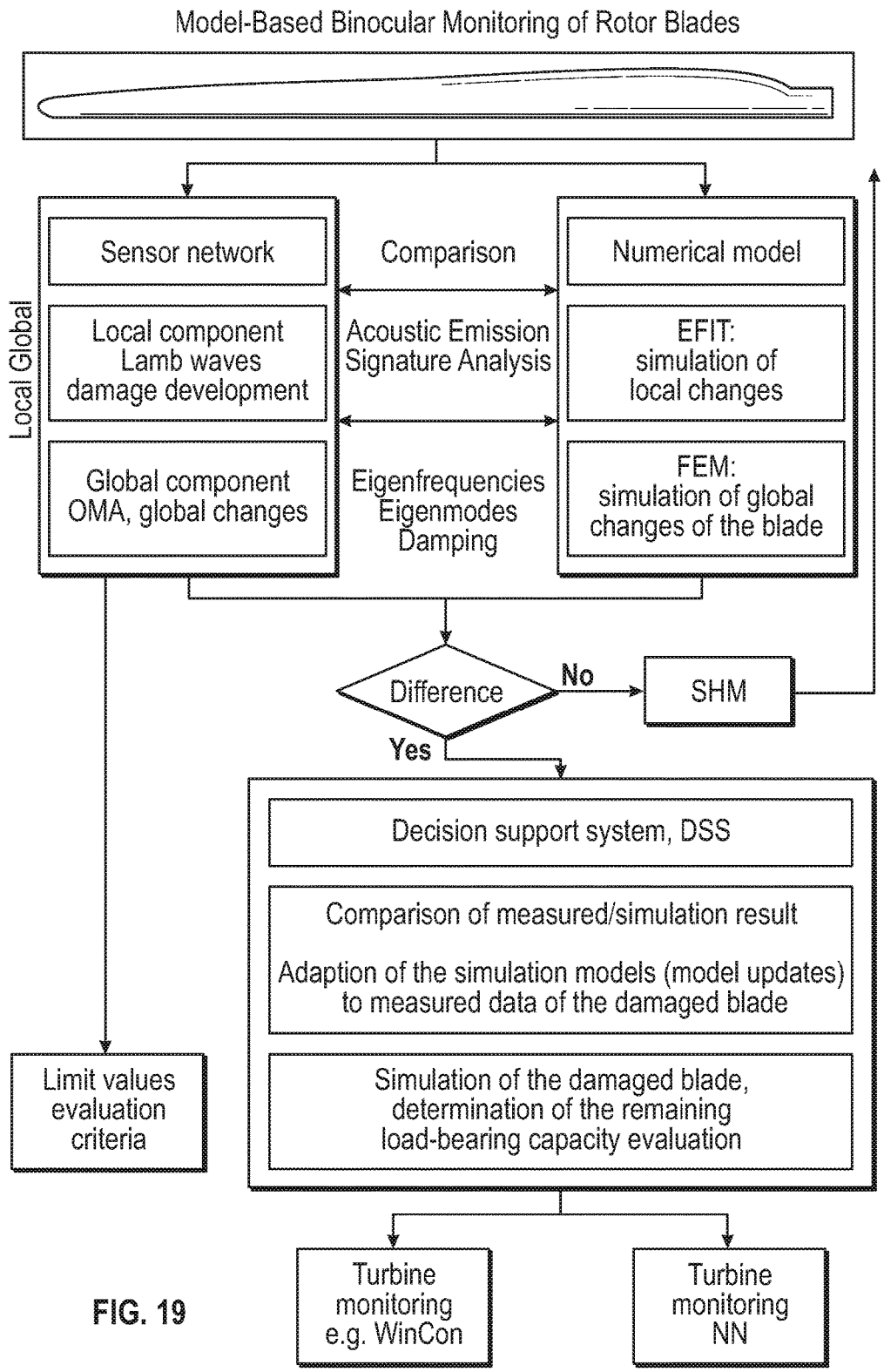
FIG. 19 shows a flowchart for the carrying out of the total process for the monitoring.

A flowchart for the carrying out of the total process for the monitoring is shown in FIG. 19. It includes a metrological component which is shown beneath the sensor network in the left hand column arrangement and a simulation component which is arranged beneath the header Numerical model in the right hand column arrangement. Both the metrological component and the simulation side can map the global behavior of the rotor blade and local variations. If the measured signals change, a check must be made whether these differences have been caused by a structural change or e.g. by ice formation. This is done by the comparison of the measured results of all measurement results carried cut at the rotor blade and simulation results. Predefinable threshold values can be taken into account here. If it is found that the varying measured signals can be traced back to structural damage, an attempt can be made with the aid of a modal update process to integrate the structural damage into the simulation models. Statements on the remaining load-bearing capacity or remaining service life of a rotor blade or of its structure can be make using a simulation model which takes the respective structural damage into account.

The invention claimed is:

1. A model-based method for monitoring the condition of rotor blades for wind turbines, wherein an eigenvibration of the rotor blade occurring globally at the rotor blade and a locally guided elastic wave is permanently detected with time resolution and space resolution using at least one of a sensor and actuator network attached to a rotor blade and using a network arrangement of ultrasound transducers;
   elastic waves which are guided periodically at predefinable time intervals and which are respectively emitted by at least one of an actuator and a ultrasound transducer and detected by at least one of a sensor and an ultrasound transducer are inspected for variations of the emitted waves, wherein a detection of emitted guided elastic waves is carried out simultaneously by at least one of a) three sensors and b) three ultrasound transducers; and
   wherein, in the permanent detection for the global monitoring of the condition, at least one of the signal arrival times and the amplitudes are detected in a predefinable frequency range as a consequence of elastic waves emitted due to structural damage of a rotor blade;
   wherein at least one of the acoustic energy and the ration of acoustic amplitude to acoustic energy are detected; and
   wherein a frequency distribution of detected acoustic events, related to the respective position of a sensor or ultrasound transducer, is determined for guided elastic waves which have been detected using sensors or ultrasound transducers.

2. The method in accordance with claim 1, wherein the guided elastic waves are emitted in a defined form for determining the transfer function of at least one of an actuator and an ultrasound transducer and in so doing an acoustic signature analysis is carried out using at least one of a sensor and an ultrasound transducer.

3. The method in accordance with claim 1, wherein the transit times of the elastic waves emitted by at least one of an actuator and an ultrasound transducer to another at least one of a sensor and another ultrasound transducer are determined.

4. The method in accordance with claim 1, wherein the transfer behavior of the rotor blade structure is modeled in cycles from the measured signals for at least one of the vibration speeds, vibration accelerations and local elongations and structural damage is determined by a comparison between an instantaneously identified model with a previously identified model with reference to damage-sensitive model parameters.

5. The method in accordance with claim 4, wherein modal parameters are extracted from the identified models by operational modal analysis (OMA) and these parameters are compared with the associated simulated parameters.

6. The method in accordance with claim 4, wherein at least one of eigenfrequencies, eigenmodes and modal damping are used as the parameters.

7. The method in accordance with claim 4, wherein at least one of variations in and damage to a rotor blade are recognized by a comparison of changed measured signals to at least one of measured signals and simulation models including finite element method simulation (FEM simulation) of at least one of an undamaged rotor blade and the starting structure of a rotor blade.

8. The method in accordance with claim 7, wherein a localization of respective damage takes place by guided elastic waves which are emitted by a damage event and which are detected by at least three sensors or ultrasound transducers and the position coordinates of the damage are integrated into the simulation model.

9. The method in accordance with claim 4, wherein, after taking into account detected structural damage which had occurred at a rotor blade in the respective finite element model, at least one of the stress and the remaining load-bearing capacity present at this moment are determined.

10. The method in accordance with claim 1, wherein local elongations at the rotor blade are determined using at least one of ultrasound transducers and another sensor.

11. The method in accordance with claim 1, wherein at least one network is formed by at least one of sensors, actuators or ultrasound transducers in which the spacings of adjacent sensors and ultrasound transducers are smaller in critical rotor blade regions exposed to higher stresses than in other regions of the rotor blade.

12. The method in accordance with claim 1, wherein the events of the model-based methods for local and global monitoring of a condition are combined to one evaluation result.

13. The method in accordance with claim 1, wherein the guided elastic wave is emitted in a defined form for determining the transfer function of the actuator and in so doing an acoustic signature analysis is carried out using the sensor.

14. The method in accordance with claim 1, wherein the guided elastic wave is emitted in a defined form for determining the transfer function of the at least one ultrasound transducer and in so doing an acoustic signature analysis is carried out using the at least one ultrasound transducers.

* * * * *